United States Patent [19]
Craun et al.

[11] Patent Number: 6,034,157
[45] Date of Patent: Mar. 7, 2000

[54] PROCESS FOR PRODUCING A COATING COMPOSITION

[75] Inventors: Gary P. Craun, Berea, Ohio; Neal S. Williams, Bracknell, United Kingdom

[73] Assignee: Imperial Chemical Industries, Plc., London, United Kingdom

[21] Appl. No.: 08/942,746

[22] Filed: Oct. 2, 1997

[30] Foreign Application Priority Data

May 1, 1997 [GB] United Kingdom ............... 9708825

[51] Int. Cl.⁷ ............... C08K 3/20; C08L 63/02
[52] U.S. Cl. ............... 523/409; 523/407; 523/412
[58] Field of Search ............... 523/407, 409, 523/412

[56] References Cited

U.S. PATENT DOCUMENTS

| | | |
|---|---|---|
| 4,212,781 | 7/1980 | Evans et al. . |
| 4,560,714 | 12/1985 | Gajria et al. ............... 523/409 |
| 5,389,703 | 2/1995 | Lee . |
| 5,554,671 | 9/1996 | Craun et al. ............... 523/408 |

FOREIGN PATENT DOCUMENTS

| | | |
|---|---|---|
| 845476 | 11/1997 | Belgium . |
| 0684294 | 11/1995 | European Pat. Off. . |
| 49-106586 | 10/1974 | Japan . |

*Primary Examiner*—Robert Dawson
*Assistant Examiner*—D. Aylward
*Attorney, Agent, or Firm*—Thomas M. Schmitz

[57] ABSTRACT

A process for producing an aqueous coating composition comprising an aqueous dispersion of internally crosslinked polymer microgel particles in which the microgel articles are produced by emulsion polymerisation of ethylenically unsaturated monomers including carboxyl functional monomer in an aqueous medium so as to form an aqueous dispersion of carboxyl functional addition polymer followed by reacting this polymer dispersion with a diepoxide resin having an epoxide equivalent weight between 100 and 5000 to form the crosslinked polymer microgel particles.

19 Claims, No Drawings

PROCESS FOR PRODUCING A COATING COMPOSITION

This invention relates to a process for producing an aqueous coating composition comprising an aqueous dispersion of crosslinked polymer microgel particles and to certain novel compositions produced by means of the process. It also relates to a coating process using the compositions. The coating compositions are particularly useful as can coatings for beverage and food containers.

Industrial coatings are surface protective coatings (paint coatings) applied to substrates and typically cured or crosslinked to form continuous films for decorative purposes as well as to protect the substrate. A protective coating ordinarily comprises an organic polymeric binder, pigments, and various paint additives, where the polymeric binder acts as a fluid vehicle for the pigments and imparts Theological properties to the fluid paint coating. Upon curing or crosslinking, the polymeric binder hardens and functions as a binder for the pigments and provides adhesion of the dried paint film to the substrate. The pigments may be organic or inorganic and functionally contribute to opacity and color in addition to durability and hardness. Protective coatings which contain little or no opacifying pigments are described as clear coatings. The manufacture of protective coatings involves the preparation of a polymeric binder, mixing of component materials, grinding of pigments in the polymeric binder, and thinning to commercial standards.

Epoxy resins are particularly desirable for use in protective surface coating materials as a vehicle or polymeric binder for the pigments, fillers, and other additives where the epoxy resins advantageously provide toughness, flexibility, adhesion, and chemical resistance. Water-dispersed coating compositions containing epoxy resins are highly desirable for can coating compositions and particularly useful for interior surfaces of containers. Coatings for soft drink and beer cans, for instance, are critical due to taste sensitivity wherein such can coatings must not alter the product taste of beverages in the containers. Taste problems can occur in a variety of ways such as by leaching of coating components into the beverage, by absorption of flavor by the coating, sometimes by chemical reaction, or by some combination of these.

Can coating technology frequently utilizes an epoxy resin which has been grafted with acrylic monomers, styrene, and methacrylic acid. This grafted epoxy resin is prepared in solvent, usually butyl cellosolve, and n-butanol, to maintain low processing viscosities and then dispersed in water. Although the cured film properties are highly desirable, such coatings suffer from the fact that sizable amounts of solvents are carried over from the process of producing the grafted epoxy resin into the final composition.

Epoxy based can coatings comprising a carbon grafted acrylic chain are disclosed in commonly assigned U.S. Pat. No. 4,212,781 which teaches a carbon grafting process involving solvent polymerization at moderate temperatures with high levels of peroxide initiator to produce a carbon-graft polymer. The acrylic grafted epoxy is particularly useful when utilized with a coreactive crosslinking melamine crosslinker. Aqueous coating compositions based on microgel resin reaction product obtained by the esterification reaction of epoxy resin with a carboxyl group containing vinyl polymer are disclosed in U.S. Pat. No. 4,897, 434 where major amounts of high molecular weight epoxy are esterified in organic solvent with the carboxyl vinyl polymer to produce a non-gelled epoxy ester. The epoxy ester is subsequently dispersed into water followed by further coreacting of available epoxy and carboxyl groups on the preformed epoxy ester to form a microgel product. U.S. Pat. No. 5,508,325 discloses aqueous dispersed microgel polymers produced by dispersing carboxyl functional acrylic-epoxy copolymer resin into water followed by dispersion of diepoxide and then crosslinking of the carboxyl copolymer by the diepoxide. Similar aqueous dispersed diepoxide crosslinked microgel polymeric compositions are disclosed in related U.S. Pat. Nos. 5,464,885, 5,554,671, 5,576,360 and 5,526,361.

In all of these prior art processes, the high solvent levels used in the production of the components of the composition invariably carry over to the aqueous dispersion when the resulting polymers are dispersed into water. In general, this produces compositions with a volatile organic content of at least about 100 g/Kg of dispersion non-volatile content.

It now has been found that excellent aqueous dispersed protective coating compositions containing very low levels or zero levels of organic solvent, based on a polymeric binder comprising an aqueous dispersion of carboxl functional addition polymer microgel particles which are internally crosslinked with a diepoxide resin, can be prepared through a novel process of making the microgel particles by emulsion polymerization of certain ethylenically unsaturated monomers and reacting the resulting polymer with a diepoxide. Making the microgel particles by this method wholly eliminates the inevitable inclusion of solvent which arises from the prior art methods and allows dispersions to be made which are essentially free of organic volatile material. Essentially solvent-free dispersions of this type were not previously possible without a laborious solvent stripping step. Although a small amount of solvent is sometimes added to these types of composition to improve application properties, the present invention allows one to start from an essentially solvent free composition and to add only the minimum amount of solvent required, rather than having to accept the quantity of solvent derived from the known methods of preparation.

According to the present invention there is provided a process for producing an aqueous coating composition comprising an aqueous dispersion of internally crosslinked polymer microgel particles in which the microgel particles are produced by emulsion polymerisation of ethylenically unsaturated monomers including carboxyl functional monomer in an aqueous medium so as to form an aqueous dispersion of carboxyl functional addition polymer followed by reacting this polymer dispersion with a diepoxide resin having an epoxide equivalent weight between 100 and 5000 to form the crosslinked polymer microgel particles.

A further advantage of the crosslinked polymer microgel particles made according to this process is that the compositions show reduced phase separation between the epoxy resin component and the addition polymer component in final coating films. These two types of component are not very compatible and often separate out in conventional compositions when they are heated after application so as to form a final coating film. This separation gives rise to separate microdomains of addition polymer and epoxy resin in the film. This can lead to a reduction in film performance because of the inherent weakness of the addition polymer component. While not being bound by this theory, it is believed that the process of the present invention leads to a greater degree of coreaction and interpenetrating crosslinking between the epoxy and acrylic components than in prior art processes and that morphological rearrangement and separation is thus prevented due to lack of mobility of the crosslinked components. Thus, highly desired uniform film formation can be achieved while the effects of inherent incompatibility between epoxide resins and acrylic latexes are avoided. The films exhibit excellent water resistance along with good clarity and gloss. The films are particularly suitable for application to metal food (including pet food) and beverage cans.

Emulsion polymerization of the ethylenically unsaturated monomers is carried out in the aqueous medium in the presence of a polymerisation initiator. It can generally be carried out by heating the monomers dispersed in the aqueous medium in the presence of a polymerisation initiator and a surfactant to a temperature at which the initiator initiates polymerization of the monomers. Most conveniently, the monomers are fed slowly into the aqueous medium together with, initiator, and optionally the diepoxide resin, the aqueous medium being held at a suitably elevated temperature such as 50 to 95° C., preferably 60 to 90° C. throughout the monomer addition. The surfactant, which aids dispersion of the monomers can be added with the monomers, it can be dissolved in the aqueous medium, or, preferably, it can be divided between the two. Chain transfer agents, such as thiols, can also be included to control the molecular weight of the polymer and these are usually mixed in with the monomers. A short pre-polymerisation step in which a small proportion, for example 5 to 15%, of the monomers and other components is first added to the aqueous medium and polymerised so as to form a polymer seed before the bulk of the monomers and other components are added has been found to improve the consistency of the particle size distribution.

Preferably, the process is carried out in two stages in which in the first stage the ethylenically unsaturated monomers are polymerised in the presence of the diepoxide resin in the aqueous medium, and in the second stage the diepoxide resin is subsequently reacted with the resulting non-crosslinked carboxyl functional addition polymer to form the crosslinked polymer microgel particles. This process allows relatively low levels of carboxyl functional monomer to be used and can result in polymers of relatively low acid value which tends to give films with better moisture resistance.

In this preferred method, the ethylenically unsaturated monomers are preferably premixed and added simultaneously with the diepoxide resin and the polymerizing initiator to the aqueous medium. More preferably the diepoxide resin is dissolved in the mixture of ethylenically unsaturated monomers which facilitates larger scale processing and lowers the level of coagulum. Dissolving the diepoxide resin in the monomers also facilitates the use of higher molecular weight or higher viscosity diepoxide resins.

A less preferred process can be carried out in three stages in which in the first stage the ethylenically unsaturated monomers are polymerised in the absence of the diepoxide resin so as to produce an aqueous dispersion of non-crosslinked carboxyl functional addition polymer, in the second stage the diepoxide resin is added and dispersed into the aqueous dispersion of non-crosslinked carboxyl functional addition polymer from the first stage, and in the third stage the diepoxide resin is reacted with the addition polymer to produce the crosslinked polymer microgel particles. In this second method, the ethylenically unsaturated monomers are premixed and added to the aqueous medium along with surfactant and polymerizing initiators as well as any other emulsion polymerization ingredients.

The aqueous medium is one which comprises water and optionally a water miscible organic solvent. Small quantities of organic solvent can be beneficial in some compositions in improving the wetting of the substrate surface or improving coalescence or flow-out of the particles and some or all of the required solvent can be included in the aqueous medium. However, the amount of such solvent is best kept as low as possible for environmental reasons. Preferably the level of organic solvent is kept low, such as below 2% by weight, or preferably below 0.5%, more preferably below 0.1% and most preferably there is substantially no organic solvent in the aqueous medium.

Initiators can include for example typical free radical and redox types such as hydrogen peroxide, t-butyl hydroperoxide, di-t-butyl peroxide, benzoyl peroxide, 2,4-dichlorbenzoyl peroxide, t-butylperacetate, azobisisobutyronitrile, ammonium persulphate, sodium persulphate, potassium persulphate, sodium and potassium perphosphates, and redox initiators such as mixtures of persulphate salt and sodium formaldehyde sulphoxylate, cumene hydroperoxide and sodium metabisulphite, potassium persulphate and sodium bisulphite or cumene hydroperoxide and ascorbic acid. Polymerization initiators are usually added in amounts between about 0.1 and 2% by weight of the monomers polymerized, preferably between 0.5 and 2%.

Suitable anionic surfactants include for example salts of fatty acids such as sodium and potassium salts of stearic, palmitic, oleic, lauric, and tall oil fatty acids, salts of sulphated fatty alcohols, salts of phosphoric acid esters of polyethoxylated long chain alcohols and phenols, as well as sulphosuccinates such as dihexyl, dioctyl, ditridecyl and dodecylbenzene sulphonate. Suitable non-ionic surfactants include polyoxyethylene glycols reacted to a lypophilic compound to produce a hydrophile lypophile balance (HLB) greater than 8 and preferably between 10 and 20, such as commercially known surfactants such as Triton™ surfactant, Igepal CAT™ surfactant, and Tween™ surfactants. Preferred surfactants are FDA approved surfactants such as sodium dioctyl sulphosuccinate, sodium dodecyl sulphate or sodium dodecyl benzene sulphonate. A co-surfactant such as hexyl Cellosolve can be used to control and reduce particle size. Surfactants are usually added in amounts from 0.2 to 2% based on total polymer solids including diepoxide resin.

Ethylenically unsaturated monomers contain carbon to carbon double bond unsaturation and generally include vinyl monomers, styrene monomers, acrylic monomers, allylic monomers, acrylamide monomers, as well as carboxl functional monomers. Vinyl monomers include vinyl esters such as vinyl acetate, vinyl propionate and similar vinyl lower alkyl esters, vinyl halides, vinyl aromatic hydrocarbons such as styrene and substituted styrenes, vinyl aliphatic monomers such as alpha olefins and conjugated dienes, and vinyl alkyl ethers such as methyl vinyl ether and similar vinyl lower alkyl ethers. Acrylic monomers include lower alkyl esters of acrylic or methacrylic acid having an alkyl ester chain from one to twelve carbon atoms as well as aromatic derivatives of acrylic and methacrylic acid. Useful acrylic monomers include for instance methyl, ethyl, butyl, and propyl acrylates and methacrylates, 2-ethyl hexyl acrylate and methacrylate, cyclohexyl, decyl, and isodecyl acrylates and methacrylates, and similar various acrylates and methacrylates. The carboxyl functional monomers can be acrylic and methacrylic acids, fumaric or maleic or similar unsaturated dicarboxylic acid, and the preferred carboxyl functional monomers are acrylic and methacrylic acid. The ethylenically unsaturated monomers comprise by weight between about 1% and 50% carboxyl functional monomers, preferably between 5% and 40%, most preferably between 10% and 35% with the balance being other ethylenically unsaturated monomers.

The carboxyl functional addition polymer is preferably made so as to have a weight average molecular weight between about 5,000 and 10,000,000 as measured by gel permeation chromatography (GPC), more preferably 10,000 to 100,000. The Tg or softening point of the addition polymer is preferably between 20 and 150° C. as calculated by the Fox equation or measured by ASTM 3418-75, more preferably 30 to 80° C. The addition polymer preferably has a theoretical acid value between 50 and 195, more preferably 100 to 195.

Diepoxide crosslinking is achieved by applying heat to increase the rate of the acid-epoxy crosslinking reaction. For example, the composition can be heated to between 50 and 95° C. for between 0.5 and four hours. Although not preferred, crosslinking can occur at room temperature over a long period of time Catalysts such as tertiary amines, phosphines, pyridine, and the like can be added at low levels (0.1 to 1%) to increase the acid-epoxy reaction rate.

Diepoxide resins useful for crosslinking the carboxyl functional addition polymer are predominantly linear chain molecules comprising the coreaction product of polynuclear dihydroxy phenols or bisphenols with halohydrins to produce diepoxide resins containing predominantly two epoxy groups per molecule. The most common bisphenols are bisphenol-A, bisphenol-F, bisphenol-S, and 4,4 dihydroxy bisphenol, with the most preferred being bisphenol-A. Halohydrins include epichlorohydrin, dichlorohydrin, and 1,2-dichloro-3-hydroxypropane with the most preferred being epichlorohydrin. Preferred diepoxide resins comprise the coreaction product of excess molar equivalents of epichlorohydrin with bisphenol-A to produce predominantly an epoxy group terminated linear molecular chain of repeating units of diglycidyl ether of bisphenol-A containing between 2 and 25 repeating copolymerized units of diglycidyl ether of bisphenol-A In practice, an excess molar equivalent of epichlorohydrin are reacted with bisphenol-A to produce diepoxide resins where up to two moles of epichlorohydrin coreact with one mole of bisphenol-A, although less than complete reaction can produce diepoxide resin along with monoepoxide chains terminated at the other end with a bisphenol-A unit. The preferred diepoxide resins are polyglycidyl ethers of bisphenol-A. These have terminating epoxide groups. They preferably have a number average molecular weight between 200 and 10,000 and more preferably from about 360 to 1,000 as measured by gel permeation chromatography (GPC). Commercially available lower molecular weight diepoxide resins include Dow Chemical epoxy resins identified by trade number and average molecular weights as follows: DER 333 (380)™; DER 661™ (1050); while Shell Chemical diepoxide resins are EPON 828™ (380); EPON 836™ (625); EPON 100™ (1050); and Ciba-Geigy linear diepoxide resins GT-7013™ (1400); GT-7014™ (1500); GT-7074™ (2000) and GT-259™ (1200).

The preferred epoxy equivalent weight is between 100 and 5,000, more preferably between 100 and 1000 and most preferably between 180 and 500. High equivalent weight diepoxide resins do not disperse well, although blends containing minor amounts of higher molecular weight epoxy resins are workable. Diepoxide resins can include branched epoxies comprising branched chains where at least two of the chains contain terminal epoxide groups. Branched diepoxide resins having two or more terminal epoxide groups can be produced by coreacting epichlorohydrin with polynuclear polyhydroxy phenols, trifunctional phenols, or aliphatic trifunctional alcohols.

Diepoxide resins further include non-aqueous alkylene oxide resins which are epoxide functional resins comprising an alkylene oxide adduct of a bisphenol compound. The alkylene oxide is an aliphatic alkyl derivative having up to about 26 carbon atoms although preferred oxides are lower alkyl oxides such as ethylene, propylene, and butylene oxides. Bisphenol compounds include bisphenol-A, bisphenol-F and bissulphone or sulphides. Typically two or more moles of alkyl oxide are coreacted with one mole of bisphenol compound. Preferred compositions are 2:1 molar reactions while suitable molecular weight range of alkylene oxide resins is between 200 and 10,000 where preferred molecular weights are between 200 and 1,000 as measured by GPC.

Preferably the dispersion of crosslinked polymer microgel particles contains by non-volatile weight between 40% and 99%, preferably 50% and 95% carboxyl functional addition polymer based on the total amount of carboxyl functional addition polymer and diepoxide resin. Preferably the dispersed crosslinked polymer microgel particles have an average particle size below 5 μm, desirably less than 1 μm, and preferably less than 0.5 μm.

Preferably, the dispersion of crosslinked polymer microgel particles has an acid value above 30, preferably between 50 and 200 based on non-volatile weight of the microgel particles.

Preferably the process includes adding a base so as to at least partially neutralize the carboxyl groups on the addition polymer. The neutralization of the carboxylic acid groups gives the dispersion greater colloidal stability. The addition of a base causes an increase in the low shear viscosity of the composition and allows viscosity control and adjustment to a desired level. Not only that, but addition of base causes the microgel particles to swell. The swollen microgel particles are pseudoplastic, that is, their low shear viscosity is higher than their high shear viscosity. The level of pseudoplasticity, that is the difference between low and high shear viscosity, rises with increasing addition of base. Pseudoplasticity is a very useful property of a coating composition because it can cause the viscosity to be low at high shear rates, such as at a spray nozzle, thus giving good spray atomization and high at low shear rates such as on a substrate thus giving a low degree of sagging or running of the wet coating.

Ammonia or an amine, such as dimethylethanolamine, or mixtures thereof are the preferred bases, while hydroxyl bases, such as alkali metal hydroxides are useful but less preferred. Preferably, the amount of base present is such as to be capable of neutralizing between 50% and 100% of the carboxyl groups based on the theoretical acid content of the carboxyl functional addition polymer as made. On a weight basis the composition typically comprises between 1% and 10%, and preferably between 2 and 5% of base, based on the polymeric weight of the polymer microgel particles.

The base can be added with and mixed with ordinary agitation at the completion of the carboxyl functional addition polymer formation or after the diepoxide crosslinking step. Certain bases, such as tertiary amines can act both to catalyse the diepoxide crosslinking reaction and to partially neutralise the carboxyl groups. The base ordinarily is diluted with water to control viscosity during the mixing and swelling process. When the preferred two-stage process outlined above is used, the base is preferably added after the diepoxide resin has been reacted with the carboxyl functional addition polymer. This effectively allows the viscosity and pseudoplasticity of the composition to be adjusted after the dispersion of crosslinked polymer microgel particles has been made, merely by adding base. This is very much more convenient than having to adjust the composition of the dispersion during its manufacture and then having to make a new dispersion if the viscosity characteristics are not those desired.

When the microgel particles are made by the less preferred three-stage method outlined above, the base is preferably added after formation of the non-crosslinked addition polymer dispersion and before the diepoxide resin is added.

Previous methods of producing similar polymer dispersions have inevitably resulted in a certain amount of solvent being present in the final composition, the solvent being carried over from the method of producing one or more of the components. Compositions of this type which have a volatile organic content of less than 100 g/Kg based on non-volatile polymer content are new.

According to the present invention there is provided an aqueous coating composition having a volatile organic content of less than 100 g/kg based on non-volatile polymer content, comprising an aqueous dispersion of crosslinked polymer microgel particles, the polymer microgel particles comprising a carboxyl functional addition polymer which is crosslinked with a diepoxide resin having an equivalent weight between 100 and 5000.

Preferably the composition as made contains at most 30 g of volatile organic material per kg of composition, more preferably less than 10 g, most preferably less than 1 g.

In a further aspect of this invention, phenolic resins can be added to the polymeric composition to provide additional chemical resistance. The phenolic can then be premixed with the ethylenically unsaturated monomer and diepoxide resin and emulsified in water with surfactant prior to aqueous copolymerization. Useful phenolic resins are those essentially soluble in ethylenic monomers, preferably in acrylic monomers, and comprise alkyl substituted resole or novolac phenolic resins. Straight phenol formaldehyde resins for instance ordinarily are not soluble in acrylic monomers and do not work satisfactorily. The ethylenically unsaturated monomers serve as a carrier solvent subsequently copolymerized to provide an in-situ formed emulsion copolymer. The liquid solution of diepoxide resin and phenolic is then emulsified and the monomers aqueous copolymerized using a thermal or redox initiator system. A ratio between 16:4:80 and 48:12:40 of diepoxide: phenolic: ethylenically unsaturated monomers has been found useful, where an optimal ratio is approximately 40:10:50 diepoxide: phenolic: ethylenically unsaturated monomers. Although not preferred, a suitable co-solvent can be added to the mixture which adds VOC to the coating composition.

The resulting aqueous coating composition can be applied satisfactorily by conventional methods known in the coating industry. Thus, spraying, rolling, dipping, and flow coating application methods can be used for both clear and pigmented films, although spraying is preferred and pseudoplastic compositions made according to the present invention are particularly suitable for spray application.

For spraying, preferably the coating composition contains between about 10% and 30% by weight polymeric solids relative to 90% to 70% water including other volatiles such as minimal amounts of solvents, if desired. For applications other than spraying, the aqueous polymeric dispersions can contain between about 10% and 40% by weight polymer solids. Organic solvents can be utilized if desired to facilitate spray or other application methods and such solvents include hexyl Cellosolve™, n-butanol, 2-butoxy-ethanol-1, xylene, toluene, and preferably n-butanol is used in combination with 2-butoxy-ethanol-1. The coating composition of the present invention can be pigmented and/or opacified with known pigments and opacifiers. For many uses, including food use, the preferred pigment is zinc oxide. The compositions of the present invention are particularly useful for coating metal food or beverage cans. After application onto the metal substrate, the coating is cured thermally at temperatures in the range from about 150° C. to 220° C. or higher, for sufficient time to effect complete curing as well as volatilizing of any fugitive component in the liquid coating, for example for 1 to 10 minutes.

For metal sheet substrates intended as beverage containers and particularly for carbonated beverages such as beer, the coating should be applied at a film thickness of 1 to 20, preferably 3 to 10 µm.

For a better understanding of the present invention, the following examples are provided wherein all parts are parts by weight, all percentages are weight percentages, and temperatures are degrees Centigrade, unless otherwise expressly indicated.

EXAMPLE 1

An aqueous dispersed epoxy acrylic microgel polymeric binder was produced as follows.

|    | Component | Weight (parts) |
|----|-----------|----------------|
| A. | Demineralized water | 13.07 |
|    | Aerosol OT 75 ™ (dioctyl sulphosuccinate, 75%) | 0.04 |
| B. | Styrene | 4.50 |
|    | Ethyl acrylate | 3.38 |
|    | Methacrylic acid | 3.38 |
|    | N-octyl mercaptan | 0.23 |
|    | Aerosol OT 75 ™ | 0.06 |
| C. | Demineralized water | 0.41 |
|    | Ammonium persulphate | 0.06 |
| D. | Demineralized water | 0.81 |
|    | Ammonium persulphate | 0.11 |
| E. | Demineralized water | 15.81 |
|    | dimethylethanol amine | 1.13 |
|    | Aqueous ammonia (28%) | 1.71 |
| F. | Epikote 880 ™ (diepoxide, equivalent weight 182–192 molecular weight 380) | 4.68 |
| G. | Hot (80° C.) Demineralized water | 50.62 |

Component A was heated to 80° C. under a nitrogen blanket in a reaction vessel equipped with a propeller type stirrer. 10% by weight of feed B was added to the reaction vessel as a seed stage and held at 80° C. for about 10 minutes. Seed initiator solution C was added and the reaction mixture temperature was increased to 85° C. and held for about 30 minutes. The remainder of feed B along with feed initiator D were added uniformly over a three hour period while holding the reaction temperature at about 85° C. After the feed was complete, the reaction was held at 85° C for one hour. The reactants were diluted with water by adding component E, whereupon the mixture temperature was adjusted to 60° C. and then held for one hour. The amount of amine and ammonia base was sufficient to neutralize approximately 71% of the available carboxyl groups on the addition polymer. Liquid diepoxide resin F was then added to the reaction mixture with vigorous stirring followed by holding the mixture at 60° C. for 10 minutes. Hot demineralized water G was added to reduce the non-volatile solids content to about 20% by weight. The reaction mixture was adjusted to 90° C. and held for two hours at 90° C. The resulting aqueous dispersion of crosslinked polymer microgel particles was cooled to 30° C. and then filtered through 80 µm nylon mesh. The resulting aqueous dispersion of crosslinked polymer microgel particles comprised by weight 29.4% diepoxide resin and 70.6% addition polymer. The addition polymer had a calculated Tg of 73° C. and a theoretical acid value of 194 mg KOH/g of polymer. The resulting polymeric composition was applied to a substrate as a coating, heat cured, and exhibited excellent cured protective film properties.

EXAMPLE 2

An epoxy phenolic acrylic water dispersed microgel polymeric binder was produced as follows.

| | Component | Weight (parts) |
|---|---|---|
| A. | Demineralized water | 18.667 |
| | Aerosol ™ OT 75 | 0.052 |
| B. | Styrene | 6.428 |
| | Ethyl acrylate | 4.821 |
| | Methacrylic acid | 4.821 |
| | N-octyl mercaptan | 0.320 |
| | Aerosol OT 75 ™ | 0.104 |
| C. | Demineralized water | 0.580 |
| | Ammonium persulphate | 0.082 |
| D. | Demineralized water | 1.157 |
| | Ammonium persulphate | 0.160 |
| E. | Demineralized water | 22.320 |
| | Aqueous Ammonia (28%) | 2.195 |
| F. | Epikote 1001 ™ (diepoxide, equivalent weight 450–500 molecular weight 1000) | 13.875 |
| | Schenectady Sp 103 ™ (phenolic) | 3.468 |
| | Butyl Cellosolve ™ (ethylene glycol mono butyl ether) | 4.336 |
| G. | Hot (80° C.) demineralized water | 16.614 |

The components A through E inclusive were added and processed in the same manner as Example 1. The ammonia in component E was sufficient to neutralize about 64% of the carboxyl groups of the addition polymer. Component F consisted of a preformed solution of diepoxide resin and phenolic in butyl Cellosolve at 80° C. Heated solution F was added to the reactants and the reaction mixture was held for 10 minutes. Hot demineralized water G was then added to the reaction mixture to reduce the non-volatile solids content. The reaction mixture was then heated to 90° C. and held for two hours. The resulting aqueous dispersion of crosslinked polymer microgel particles was then cooled to 30° C. and filtered through 80 μm nylon mesh. The crosslinked polymer microgel particles consisted by weight ratio 41.5:10.5:48 epoxy:phenolic:addition polymer with a volatile organic content of 100 g/Kg polymeric solids. The addition polymer had a calculated Tg of 73° C., a theoretical acid value of 194 mg KOH/g of polymer solids. The aqueous dispersion of crosslinked polymer microgel particles produced an excellent protective coating in the manner of Example 1.

EXAMPLE 3

An aqueous dispersion of crosslinked polymer microgel particles was produced as follows.

| | Component | Weight (parts) |
|---|---|---|
| A. | Demineralized water | 18.667 |
| | Aerosol OT 75 ™ | 0.052 |
| B. | Styrene | 6.428 |
| | Ethyl acrylate | 4.821 |
| | Methacrylic acid | 4.821 |

-continued

| | Component | Weight (parts) |
|---|---|---|
| | N-octyl mercaptan | 0.320 |
| | Aerosol OT 75 ™ | 0.104 |
| C. | Demineralized water | 0.580 |
| | Ammonium persulphate | 0.082 |
| D. | Demineralized water | 1.157 |
| | Ammonium persulphate | 0.160 |
| E. | Demineralized water | 22.320 |
| | Aqueous ammonia (28%) | 2.195 |
| F. | Epikote 1001 ™ | 13.875 |
| | Schenectady SP 103 ™ (phenolic) | 3.468 |
| | Butyl acrylate | 2.168 |
| | Styrene | 2.168 |
| G. | Demineralized water | 16.581 |
| | Ammonium persulphate | 0.033 |

The above components A through E inclusive were processed in the same manner as in Example 2. The ammonia was sufficient to neutralize about 64% of the carboxyl groups on the emulsion copolymer and to give an acidic pH. Component F consisting of the epoxy/phenolic in a solution was added hot (80° C.) to the addition polymer reaction mixture and held for 10 minutes. Hot component G (80° C.) was added to dilute the composition and polymerise the additional monomers. The reaction temperature was increased to 90° C., held for two hours, and then cooled to 30° C. The resulting crosslinked microgel dispersion was then filtered through an 80 μm nylon mesh. The resulting dispersion of crosslinked polymer microgel particles consisted by a weight ratio 36.7:9.2:54.1 of epoxy:phenolic:addition polymer and had a volatile organic content of zero. The addition polymer had a theoretical Tg of 73° C., and a calculated acid value of 194 mgKOH/g of polymer. An excellent protective coating film was produced.

EXAMPLE 4

A aqueous dispersion of crosslinked polymer microgel particles was produced as follows.

| | Component | Weight (parts) |
|---|---|---|
| A. | Demineralized water | 20.106 |
| | Aerosol OT 75 ™ | 0.093 |
| B. | DER 331 ™ (diepoxide, equivalent weight 182–192) | 8.634 |
| | Styrene | 8.058 |
| | Ethyl acrylate | 8.058 |
| | Methacrylic acid | 4.029 |
| | Aerosol OT 75 ™ | 0.187 |
| | N-octyl mercaptan | 0.101 |
| | Demineralized water | 13.324 |
| C. | Demineralized water | 1.039 |
| | Ammonium persulphate | 0.067 |
| D. | Demineralized water | 2.072 |
| | Ammonium persulphate | 0.133 |
| E. | Demineralized water | 6.262 |
| | dimethylethanolamine | 0.421 |
| F. | Demineralized water | 13.324 |
| G. | Demineralized water | 12.658 |
| | Aqueous ammonia (28%) | 1.434 |

The components were processed in the same manner as Example I except that the diepoxide was included in the monomer feed mixture and the ammonia base neutralization was in the final thinning stage G to adjust the pH to 8.5. The ammonia was sufficient to neutralize about 50% of the carboxyl groups on the addition polymer. The resulting crosslinked polymer microgel particles consisted by weight ratio of 30% diepoxide and 70% addition polymer. The addition polymer had a theoretical Tg of 51° C. and a calculated acid value of 130 mgKOH/g of polymer. The dispersion of crosslinked polymer microgel particles produced an excellent cured protective coating.

EXAMPLE 5

|   | Component | Weight (parts) |
|---|-----------|----------------|
| A. | Demineralized water | 39.186 |
|   | Aerosol OT 75 ™ | 0.109 |
| B. | Epikote 880 ™ diepoxide resin | 10.121 |
|   | Schenectady SP 103 ™ phenolic | 1.996 |
|   | Styrene | 10.627 |
|   | Ethyl acrylate | 10.627 |
|   | Methacrylic acid | 2.361 |
|   | Aerosol OT 75 ™ | 0.219 |
|   | N-octyl mercaptan | 0.118 |
| C. | Demineralized water | 1.218 |
|   | Ammonium persulphate | 0.172 |
| D. | Demineralized water | 2.429 |
|   | Ammonium persulphate | 0.336 |
| E. | Demineralized water | 13.275 |
|   | Aqueous ammonia (28%) | 1.199 |
|   | Dimethyl aminoethanol | 0.195 |
| F. | Demineralised water | 12.123 |

Mixture A was heated to 80° C. in a 2 liter vessel fitted with turbine stirrer, condenser and nitrogen feed. 10% of mixture B was added with stirring, the mixture was stirred for 10 minutes, mixture C was added and the temperature raised to 85° C. for 30 minutes. The remains of mixture B and mixture D were fed in over 3 hours at 85° C. and held at that 20 temperature for 30 minutes. Mixture E was added over 30 minutes, F was added immediately and the mixture stirred at 85° C. for 1 hour. The mixture was cooled to 30° C. and filtered through 50 μm nylon mesh. The solids content of the resulting aqueous dispersion of crosslinked polymer microgel particles was 34.5% (after heating at 150° C. for 1 hour to drive off volatiles) and the average particle size was 0.341 μm (as measured using a Malvern Mastersizer™)

EXAMPLE 6

|   | Component | Weight (parts) |
|---|-----------|----------------|
| A. | Demineralized water | 39.447 |
|   | Aerosol OT 75 ™ | 0.110 |
| B. | Epikote 880 ™ diepoxide resin | 10.188 |
|   | Styrene | 8.320 |
|   | Ethyl acrylate | 8.320 |
|   | Methacrylic acid | 7.132 |
|   | Aerosol OT 75 | 0.220 |
|   | N-octyl mercaptan | 0.119 |
| C. | Demineralized water | 1.226 |
|   | Ammonium persulphate | 0.173 |
| D. | Demineralized water | 2.445 |
|   | Ammonium persulphate | 0.338 |
| E. | Demineralized water | 13.364 |
|   | Dimethyethanolamine | 0.385 |
| F. | Demineralised water | 12.73 |

Mixture A was heated to 80° C. in a 2 litre vessel fitted with turbine stirrer, condenser and nitrogen feed. 10% of mixture B was added with stirring, the mixture was stirred for 10 minutes, mixture C was added and the temperature raised to 85° C. for 30 minutes. The remains of mixture B and mixture D were fed in over 3 hours at 85° C. and held at that temperature for 30 minutes. Mixture E was added over 30 minutes, F was added immediately and the mixture stirred at 85° C. for 1 hour. The mixture was cooled to 30° C. and filtered through 50 μm nylon mesh. The solids content of the resulting aqueous dispersion of crosslinked polymer microgel particles was 32.2% (after heating at 150° C. for 1 hour to drive off volatiles), the pH of the composition as made was 5.0.

Samples of this composition were further neutralised with ammonia to 60, 70 and 80% of theoretical degree of neutralisation based on the number of carboxyl groups initially on the addition polymer and the solids content adjusted with demineralised water to 30%. The low shear and high shear viscosities were measured to get an indication of the pseudoplasticity of the compositions. Low shear viscosity was measured by Brookfield viscometer using a number 3 spindle at 6 rpm. High shear viscosity was measured by ICI cone and plate viscometer. Average particle size was measured using a Malvern Mastersizer™.

| Theoretical D of N (%) | pH | Particle size (microns) | Low shear viscosity (Poise) | High Shear viscosity (Poise) |
|---|---|---|---|---|
| 60 | 8.9 | 0.29 | 16 | 0.11 |
| 70 | 9.4 | 0.32 | 20 | 0.1 |
| 80 | 9.6 | 0.33 | 30 | 0.09 |

It can be seen from these results that the low shear viscosity rises with added base and that the particles swell. The high shear viscosity is little affected and the compositions thus show a greater degree of pseudoplasticity with increasing amounts of added base.

EXAMPLE 7

|   | Component | Weight (parts) |
|---|-----------|----------------|
| A. | Demineralized water | 39.161 |
|   | Aerosol OT 75 ™ | 0.215 |
| B. | Epikote 880 ™ diepoxide resin | 10.114 |
|   | Styrene | 10.620 |
|   | Ethyl acrylate | 10.620 |
|   | Methacrylic acid | 2.360 |
|   | Aerosol OT 75 ™ | 0.437 |
|   | N-octyl mercaptan | 0.118 |
| C. | Demineralized water | 1.217 |
|   | Ammonium persulphate | 0.172 |
| D. | Demineralized water | 2.427 |
|   | Ammonium persulphate | 0.336 |
| E. | Demineralized water | 13.267 |
|   | Aqueous ammonia (28%) | 0.974 |
|   | Dimethylethanolamine | 0.158 |
| F. | Demineralised water | 7.804 |

Mixture A was heated to 80° C. in a 2 litre vessel fitted with turbine stirrer, condenser and nitrogen feed. 10% of mixture B was added with stirring, the mixture was stirred for 10 minutes, mixture C was added and the temperature raised to 85° C. for 30 minutes. The remains of mixture B and mixture D were fed in over 3 hours at 85° C. and held at that temperature for 30 minutes. Mixture E was added over 30 minutes, F was added immediately and the mixture stirred at 85° C. for 1 hour. The mixture was cooled to 30° C. and filtered through 50 μm nylon mesh. The solids content of the resulting aqueous dispersion of crosslinked polymer microgel particles was 33.4% (after heating at 150°

C. for 1 hour to drive off volatiles) and the average particle size was 0.36 μm (as measured using a Malvern Mastersizer™)

EXAMPLE 8

| | Component | Weight (parts) |
|---|---|---|
| A. | Demineralized water | 23.441 |
| | Aerosol OT 75 ™ | 0.093 |
| B. | DER 331 diepoxide resin | 8.635 |
| | Schenectady SP 1068 ™ phenolic | 2.878 |
| | Styrene | 6.908 |
| | Ethyl acrylate | 6.908 |
| | Methacrylic acid | 3.454 |
| | Aerosol OT 75 ™ | 0.187 |
| | N-octyl mercaptan | 0.101 |
| | Demineralised water | 9.995 |
| C. | Demineralized water | 1.039 |
| | Ammonium persulphate | 0.067 |
| D | Demineralized water | 2.072 |
| | Ammonium persulphate | 0.133 |
| E. | Demineralized water | 6.263 |
| | Dimethylethanolamine | 0.416 |
| F. | Hot Demineralised water (60° C.) | 13.326 |
| G. | Demineralised water | 12.660 |
| | Aqueous ammonia (28%) | 1.423 |

Oil-in-water emulsion B was made by premixing the organic components and stirring until the phenolic resin had dissolved and then slowly adding the water while emulsifying using a Silverson Homogeniser™. Mixture A was heated to 80° C. in a 2 litre vessel fitted with turbine stirrer, condenser and nitrogen feed. 10% of emulsified mixture B was added with stirring, the mixture was stirred for 10 minutes and mixture C was added. The temperature raised to 85° C. for 30 minutes. The remains of mixture B and mixture D were fed in over 3 hours at 85° C. and held at that temperature for 30 minutes. Mixture E was added over 30 minutes, F was added immediately and the mixture stirred at 85° C. for 1 hour. G was added, the mixture was cooled to 30° C. and filtered through 50 μm nylon mesh. The solids content of the resulting aqueous dispersion of crosslinked polymer microgel particles was 25.6% (after heating at 150° C. for 1 hour to drive off volatiles) and the average particle size was 0.52 μm (as measured using a Malvern Mastersizer™)

TEST RESULTS

5% by weight of butyl Cellosolve was added to coating compositions 5 to 9 which were were then applied to tin plate using a No.22 Meyer wire wound bar and stoved for 10 minutes at 205° C. The test panels were crosshatch cut using a template with 2 mm spacings and immersed in boiling demineralised water for 30 minutes for the water boil test or 5% aqueous acetic acid for 30 minutes for the acid test. Adhesion was assessed after immersion by drying the panel and applying and removing Scotch™ 610 tape (from 3M). Blush was very slight to none for each cured film.

Solvent resistance was assessed using the MEK rub test. This involved rubbing the surface of the coating film with the soft surface of a piece of cloth which was folded in four, attached to a the ball end of a 650 g ball pein hammer, and soaked in methylethyl ketone. The soaked flannel is drawn back and forth across the surface of the film under the weight of the hammer with one back and forth movement being counted as one double rub. The strokes are 100–150 mm in length and the stroke rate 30+/−5 double strokes per minute. When the substrate is first exposed, rubbing is dicontinued and the number of rubs recorded.

The results were as follows.

| Composition | Acetic Acid | | Water Boil | | MEK Double |
|---|---|---|---|---|---|
| (Film Build) | Blush | Adhesion | Blush | Adhesion | Rubs |
| 5 (8 μm) | 1 | 0 | 1 | 0 | 60–70 |
| 6 (6 μm) | 0 | 0 | 0–1 | 0–20 | 280 |
| 7 (8 μm) | 1 | 0–20 | 1 | 0–20 | 80 |
| 8 (7.5 μm) | 1 | 100 | 1 | 100 | 100 |

Blush ratings;
0=no effect
2–3=moderate blush
5=heavy blush
Adhesion ratings in % age of film removed

We claim:

1. A process for producing an aqueous coating composition containing a polymeric binder of internally crosslinked microgel particles, the process for internally crosslinking the microgel particles and forming the coating composition comprising:

emulsion copolymerizing ethylencially unsaturated monomers including carboxyl functional monomers in an aqueous medium, where the monomers are copolymerized in the presence of a diepoxide resin having an epoxide equivalent weight between 100 and 5000, to form an aqueous emulsion of carboxyl functional addition copolymer containing non-reacted diepoxide resin dispersed in the emulsion carboxyl functional addition copolymer;

heat reacting the diepoxide resin with the carboxyl function addition copolymer to form an aqueous polymeric dispersion of internally crosslinked microgel particles; and producing an aqueous coating composition containing the internally crosslinked microgel particles as the polymeric binder.

2. The process claimed in 1 in which the ethylenically unsaturated monomers are premixed and added simultaneously with the diepoxide resin along with surfactants and polymerizing initiators to the aqueous polymerizing medium.

3. The process claimed in claim 1 in which the diepoxide resin is dissolved in the mixture of ethylenically unsaturated monomers prior to adding to the aqueous medium.

4. The process claimed in claim 1 in which the ethylenically unsaturated monomers comprise by weight between 1% and 50% carboxyl functional monomers.

5. The process as claimed in claim 1 in which the carboxyl functional addition copolymer formed has a theoretical acid value between 50 and 250.

6. The process claimed in claim 1 in which the diepoxide resin is a polyglycidyl ether of bisphenol A.

7. The process claimed in claim 1 in which the resulting dispersion of crosslinked microgel particles contains by non-volatile weight between 40% and 99% carboxyl functional addition copolymer based on the total amount of carboxyl functional addition copolymer and diepoxide resin.

8. The process claimed in claim 1 in which the microgel particles have a mean particle size below 5 microns.

9. The process claimed in claim 1 in which the dispersion of crosslinked polymer microgel particles has an acid value above 30.

10. The process in claim 1 wherein a base is added to the aqueous emulsion after the step of emulsion copolymerizing ethylenically unsaturated monomers to neutralize at least some of the carboxyl groups on the functional copolymer in sufficient amount to cause the resulting aqueous, polymeric dispersion of internally crosslinked microgel particles to swell and become pseudoplastic.

11. The process claimed in claim 10 in which the amount of base is sufficient to neutralize between 50% and 100% of the carboxyl groups on the crosslinked polymer microgel particles.

12. The process claimed in claim 10 in which where the base is ammonia, an amine, or a mixture of ammonia and amine.

13. The process claimed in claim 10 in which base is added after the diepoxide resin has been reacted with the carboxyl functional addition copolymer.

14. A coating composition containing an aqueous polymeric binder of an aqueous dispersion of internally crosslinked microgel particles produced by the process of claim 1, the microgel particles comprising on a weight basis between 40% and 99% of carboxyl functional addition copolymer with the balance being said diepoxide, where the crosslinked microgel particles have a mean particle size less than 5 microns.

15. The coating composition of claim 14 wherein the crosslinked microgel particles have an Acid No. above 30.

16. The coating composition in claim 16 wherein the Acid No. of the crosslinked microgel particles is between 50 and 200 and where base is added to neutralize between 50% and 100% of the carboxyl functionality of the crosslinked microgel particles.

17. The coating composition in claim 17 where the base is ammonia, an amine, or a mixture of ammonia and amine.

18. The process in claim 10 wherein the base is added before the diepoxide is crosslinked with the carboxyl functional addition copolymer.

19. The process in claim 18 wherein the base also acts as a catalyst for crosslinking the carboxyl functional addition copolymer with the diepoxide.

* * * * *